(12) United States Patent
Wang et al.

(10) Patent No.: US 10,476,378 B2
(45) Date of Patent: *Nov. 12, 2019

(54) POWER FACTOR CORRECTION CIRCUIT, CONTROL METHOD AND CONTROLLER

(71) Applicant: Silergy Semiconductor Technology (Hangzhou) LTD, Hangzhou, ZheJiang Province (CN)

(72) Inventors: Zhaofeng Wang, Hangzhou (CN); Xiaodong Huang, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/206,161

(22) Filed: Nov. 30, 2018

(65) Prior Publication Data

US 2019/0097528 A1 Mar. 28, 2019

Related U.S. Application Data

(63) Continuation of application No. 15/911,317, filed on Mar. 5, 2018, now Pat. No. 10,193,439.

(30) Foreign Application Priority Data

Mar. 20, 2017 (CN) .......................... 2017 1 0167036

(51) Int. Cl.
*H02J 3/36* (2006.01)
*H02M 1/42* (2007.01)
*H02M 1/12* (2006.01)
*H02M 1/00* (2006.01)

(52) U.S. Cl.
CPC ........... *H02M 1/4225* (2013.01); *H02M 1/12* (2013.01); *H02M 2001/0025* (2013.01); *Y02B 70/126* (2013.01); *Y02P 80/112* (2015.11)

(58) Field of Classification Search
CPC ................ H02M 1/12; H02M 1/4225; H02M 2001/0025; Y02B 70/125; Y02P 80/112
USPC .... 363/35–40, 71, 97, 98, 89; 323/205, 207, 323/282–287; 318/400.01, 400.14, 721, 318/807
See application file for complete search history.

(56) References Cited

U.S. PATENT DOCUMENTS

| | | | |
|---|---|---|---|
| 5,384,696 A | 1/1995 | Moran et al. | |
| 6,756,771 B1 | 6/2004 | Ball et al. | |
| 6,975,098 B2 * | 12/2005 | Vinciarelli | H02J 1/102 323/266 |
| 7,123,494 B2 | 10/2006 | Turchi | |
| 7,313,007 B2 | 12/2007 | Wu et al. | |
| 8,736,236 B2 | 5/2014 | Sun et al. | |
| 9,246,381 B2 | 1/2016 | Xu | |

(Continued)

*Primary Examiner* — Rajnikant B Patel
(74) *Attorney, Agent, or Firm* — Michael C. Stephens, Jr.

(57) ABSTRACT

A power factor correction circuit can include: a power meter configured to measure THD at an input port; a switching-type regulator that is controllable by a switching control signal in order to adjust a power factor of an input signal thereof; and a controller configured to generate the switching control signal to control the switching-type regulator to perform power factor correction, where the controller minimizes the THD by adjusting a current reference signal according to a measured THD, and the current reference signal represents an expected inductor current of the switching-type regulator.

15 Claims, 9 Drawing Sheets

(56) References Cited

U.S. PATENT DOCUMENTS

| | | | |
|---|---|---|---|
| 9,331,623 B2 | 5/2016 | Hirotani et al. | |
| 9,692,294 B2 | 6/2017 | Jiang et al. | |
| 9,813,001 B2 | 11/2017 | Akimatsu et al. | |
| 2007/0253223 A1* | 11/2007 | Neidorff | H02M 1/4216 363/2 |
| 2009/0257257 A1* | 10/2009 | Adragna | H02M 3/1584 363/65 |
| 2010/0187914 A1 | 7/2010 | Rada et al. | |
| 2010/0246226 A1 | 9/2010 | Ku et al. | |
| 2011/0221402 A1 | 9/2011 | Park et al. | |
| 2014/0071723 A1* | 3/2014 | Wrathall | H02M 1/4208 363/84 |
| 2014/0160815 A1 | 6/2014 | Jeong et al. | |
| 2016/0164291 A1* | 6/2016 | Rosendahl | H02J 3/14 700/295 |
| 2017/0181234 A1 | 6/2017 | Huang et al. | |

* cited by examiner

POWER FACTOR CORRECTION CIRCUIT, CONTROL METHOD AND CONTROLLER

RELATED APPLICATIONS

This application is a continuation of the following application, U.S. patent application Ser. No. 15/911,317, filed on Mar. 5, 2018, and which is hereby incorporated by reference as if it is set forth in full in this specification, and which also claims the benefit of Chinese Patent Application No. 201710167036.2, filed on Mar. 20, 2017, which is incorporated herein by reference in its entirety.

FIELD OF THE INVENTION

The present invention generally relates to the field of power electronics, and more particularly to power factor correction circuits, and associated methods and controllers.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Figure 1:
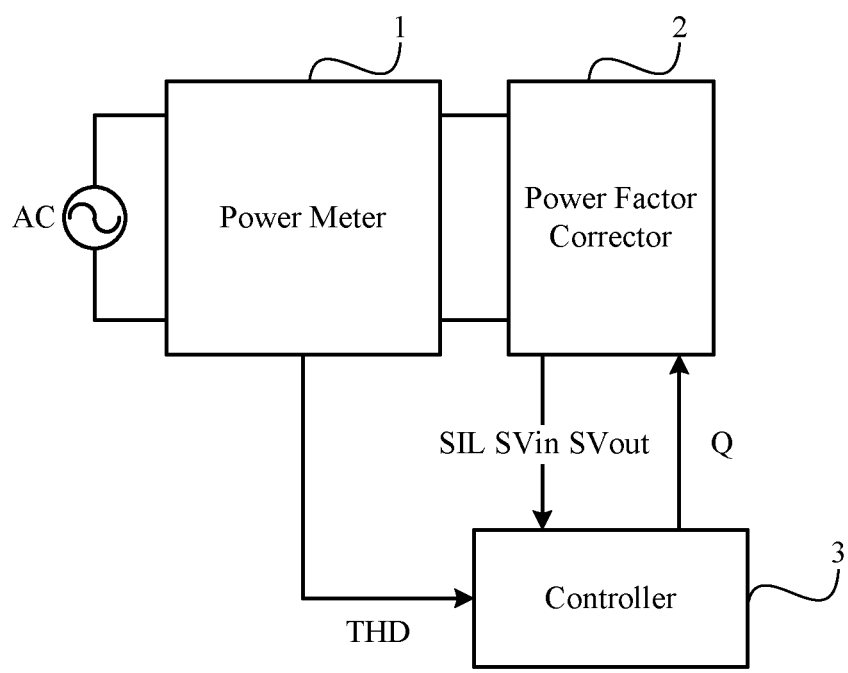
FIG. 1 is a schematic block diagram of an example power factor correction circuit, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Power factor (PF) is the cosine of the phase difference between a voltage and a current, and can also be expressed as the ratio of effective power to apparent power. The power factor is a parameter that is generally used to measure the efficiency of electrical equipment, such as switching power supplies. The phase difference between the voltage and current can be eliminated or reduced by performing a power factor correction (PFC) operation. This can improve the power factor of the system, the transmission efficiency of active power, and the overall grid environment.

An active PFC circuit typically relies on relatively fast input current closed-loop regulation, in order to make the input current track the sinusoidal AC input voltage in real-time, so as to realize power factor correction. Requirements can be raised in the performance of power factor correction considering aspects of total harmonic distortion (THD) in various modern applications, in addition to THD requirements under heavy-load conditions. THD requirements similar to heavy-load conditions can be set for various semi-load conditions, and even for light-load conditions.

Some solutions to reduce total harmonic distortion may theoretically analyze the factors that affect the total harmonic distortion, and then utilize a corresponding compensation control strategy based on the established model. However, such solutions may generally only suitable for one specific condition. Harmonic distortion refers to extra harmonic components contained in an output signal, as compared to an input signal, that may be caused by non-linear elements in the system. THD can be defined as the square root of the ratio of effective value Gn of all harmonic components to effective value G1 of the fundamental component within a certain order H; that is, $$THD = \sqrt{\sum_{n=2}^{H}\left(\frac{G_n}{G_1}\right)^2}.$$

When the THD of a device is too high, the voltage and current waveforms in the power network may be distorted, thereby affecting normal operations of other devices in the power network. In an active PFC circuit, the input current may contain higher harmonics due to the presence of non-linear components, such that the THD may need to be reduced in order to not affect the power supply network.

In one embodiment, a power factor correction circuit can include: (i) a power meter configured to measure THD at an input port; (ii) a switching-type regulator that is controllable by a switching control signal in order to adjust a power factor of an input signal thereof; and (iii) a controller configured to generate the switching control signal to control the switching-type regulator to perform power factor correction, where the controller minimizes the THD by adjusting a current reference signal according to a measured THD, and the current reference signal represents an expected inductor current of the switching-type regulator.

Referring now to FIG. 1, shown is a schematic block diagram of an example power factor correction circuit, in accordance with embodiments of the present invention. In this particular example, the power factor correction circuit can include power meter 1, power factor corrector 2, and controller 3. Power meter 1 and power factor corrector 2 may form a power stage circuit of the power factor correction circuit.

Figure 2:
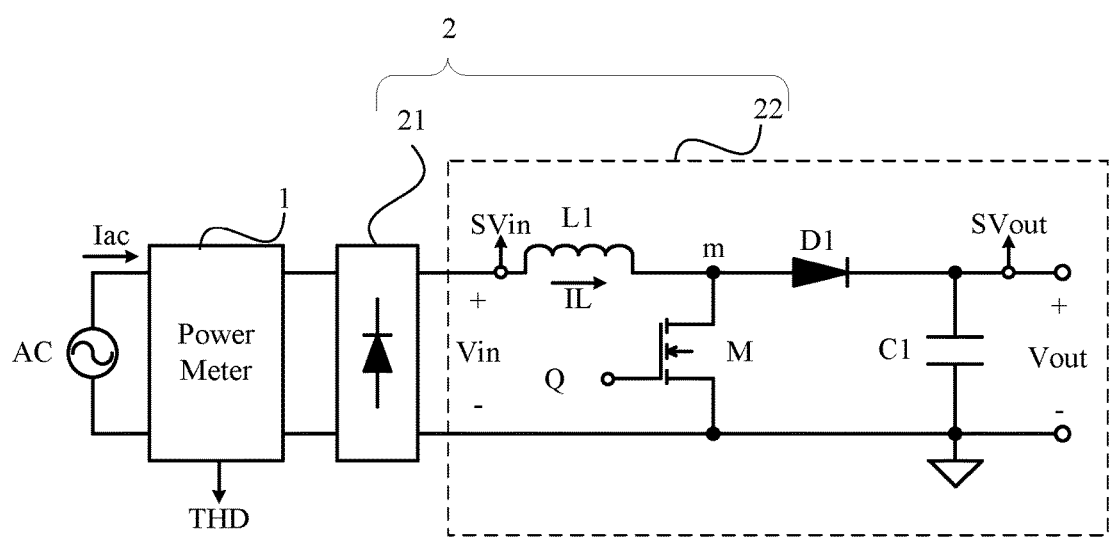
FIG. 2 is a schematic block diagram of an example power stage circuit of an example power factor correction circuit, in accordance with embodiments of the present invention.

Referring now to FIG. 2, shown is a schematic block diagram of an example power stage circuit of an example power factor correction circuit, in accordance with embodiments of the present invention. In this particular example, power factor corrector 2 can include rectifier circuit 21 and switching-type regulator 22. Rectifier circuit 21 can convert AC current Iac of input source AC to a DC current. Rectifier circuit 21 can be implemented by any suitable rectifier circuitry, such as a half-bridge rectifier circuit or a full-bridge rectifier circuit. Switching-type regulator 22 may be controlled by switching control signal Q, in order to perform power factor correction. While a topology of switching-type regulator 22 in this example is a BOOST topology, any suitable converter topology (e.g., BUCK, BUCK-BOOST, FLYBACK, etc.) can be utilized in certain embodiments.

In this example, switching-type regulator 22 can include inductor L1, switch M, diode D1, and capacitor C1. Inductor L1 can connect between an input terminal and intermediate terminal "m." Switch M can connect between intermediate terminal "m" and ground. Diode D1 can connect between intermediate terminal "m" and an output terminal, and may be utilized for rectifying the current from inductor L. Capacitor C1 can connect between the output terminal and ground, and may be used for filtering an output voltage. Switch M can be controlled by switching control signal Q to switch between ON and OFF states, in order to control the inductor current, and to actively perform power factor correction.

In order to reduce the total harmonic distortion, the power stage circuit can also include sampling circuits that can sample input voltage Vin, output voltage Vout, and inductor current IL of the switching-type regulator, and correspondingly generate input voltage sampling signal SVin, output voltage sampling signal SVout, and inductor current sampling signal SIL. These sampling signals can be provided to controller 3 to be used in generating switching control signal Q. Power meter 1 can also be coupled to an input port of power factor corrector 2, and can be used for measuring the THD at the input port. The measured THD may be provided to controller 3, and can be used in generating the switching control signal.

Controller 3 may generate switching control signal Q according to input voltage sampling signal SVin, output voltage sampling signal SVout, inductor current sampling signal SIL, and the measured total harmonic distortion THD, which can be used for controlling switching-type regulator 22. For example, controller 3 can control the inductor current of switching-type regulator 22 to approach the expected inductor current as characterized by the current reference signal. Inductor current sampling signal SIL can represent the average value, peak value, or real-time changes of inductor current IL. Controller 3 may minimize the total harmonic distortion, while performing power factor correction by adjusting the current reference signal according to measured total harmonic distortion THD.

In an alternative example, controller 3 can generate switching control signal Q by executing a digital control scheme. In such an example, controller 3 can take the measured total harmonic distortion THD into a control loop, and may generate switching control signal Q with a target of minimizing the total harmonic distortion in a closed loop. Therefore, the total harmonic distortion can be minimized while performing power factor correction by adjusting a current reference signal according to a measured total harmonic distortion. In this way, it may not be necessary to do any special compensation designs.

As described above, harmonic distortion may refer to an extra harmonic component contained in an output signal compared to an input signal that maybe caused by non-linear elements in the system. Since the AC current input to the power stage circuit of the power factor correction circuit is a periodic signal, according to Fourier analysis, the periodic signal can be decomposed into the superimposition of a DC signal and sinusoidal signals of different frequencies. The waveform of each of the harmonic components contained in the periodic signal (e.g., a sine wave having a multiple relationship with the frequency of the periodic signal) can be obtained based on the waveform of the periodic signal. Thus, the harmonic components with the same effective value and the opposite phases can be superimposed on the periodic signal (e.g., inversely superimposed), to offset the harmonic components contained in the periodic signal, in order to reduce the total harmonic distortion.

Furthermore, the inductor current of switching-type regulator 22 can be substantially the same as the input AC signal; that is, IL=Iac. Controller 3 can include a current control loop to adjust inductor current IL towards current reference signal Iref. Thus, a predetermined at least one harmonic component may be inversely superimposed on current reference signal Iref in order to adjust current reference signal Iref, adjust the inductor current IL, and cancel the unwanted harmonic components in the input AC current, in order to reduce or minimize the total harmonic distortion.

For example, because the even harmonic components (e.g., the second harmonic component, the fourth harmonic component, etc.) can cancel each other out due to the two-phase symmetry during rectification, the total harmonic distortion can be substantially reduced by only operating when the odd harmonic components are inversely superimposed. Of course, even harmonic components and odd harmonic components can both be inversely superimposed on the current reference signal, in order to more precisely reduce the total harmonic distortion; however, the computation complexity may accordingly be increased in such a case.

One or more harmonic components can be predetermined or otherwise designated. For example, controller 3 may be configured to only compensate for the third harmonic component, though the compensation may be unavailable if the input signal also contains fifth or seventh harmonic components. However, such a system may accordingly have lower complexity, and the response speed can be increased in this example implementation. In another example, controller 3 may be configured to compensate for the third, fifth, seventh, and ninth harmonic components, and if the input signal contains only the fifth and seventh harmonic components, the amplitude ratio of the third and ninth harmonic components can be set to zero, whereby more harmonic components can be compensated.

For example, the measured total harmonic distortion may be introduced to the control loop to help determine the amplitude ratio of each harmonic component in the input signal. Alternatively, controller 3 can be configured to minimize the total harmonic distortion by adjusting the amplitude ratio of each harmonic component according to the measured total harmonic distortion.

Figure 3:
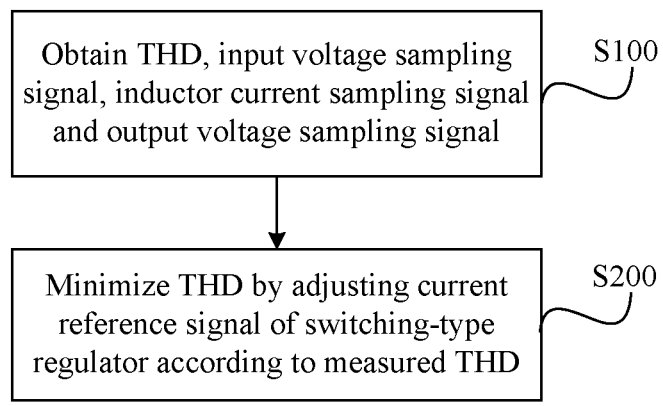
FIG. 3 is a flow diagram of an example control method, in accordance with embodiments of the present invention.

Referring now to FIG. 3, shown is a flow diagram of an example control method, in accordance with embodiments of the present invention. In this particular example, the control method can include, at S100, obtaining the measured total harmonic distortion THD, input voltage sampling signal SVin, inductor current sampling signal SIL, and output voltage sampling signal SVout. At S200, the total harmonic distortion THD can be minimized by adjusting current reference signal Iref according to the measured total harmonic distortion THD. In addition, at S200, purposes of power factor correction can also be achieved based on input voltage sampling signal SVin, inductor current sampling signal SIL, and output voltage sampling signal SVout, in other control loops.

Figure 4:
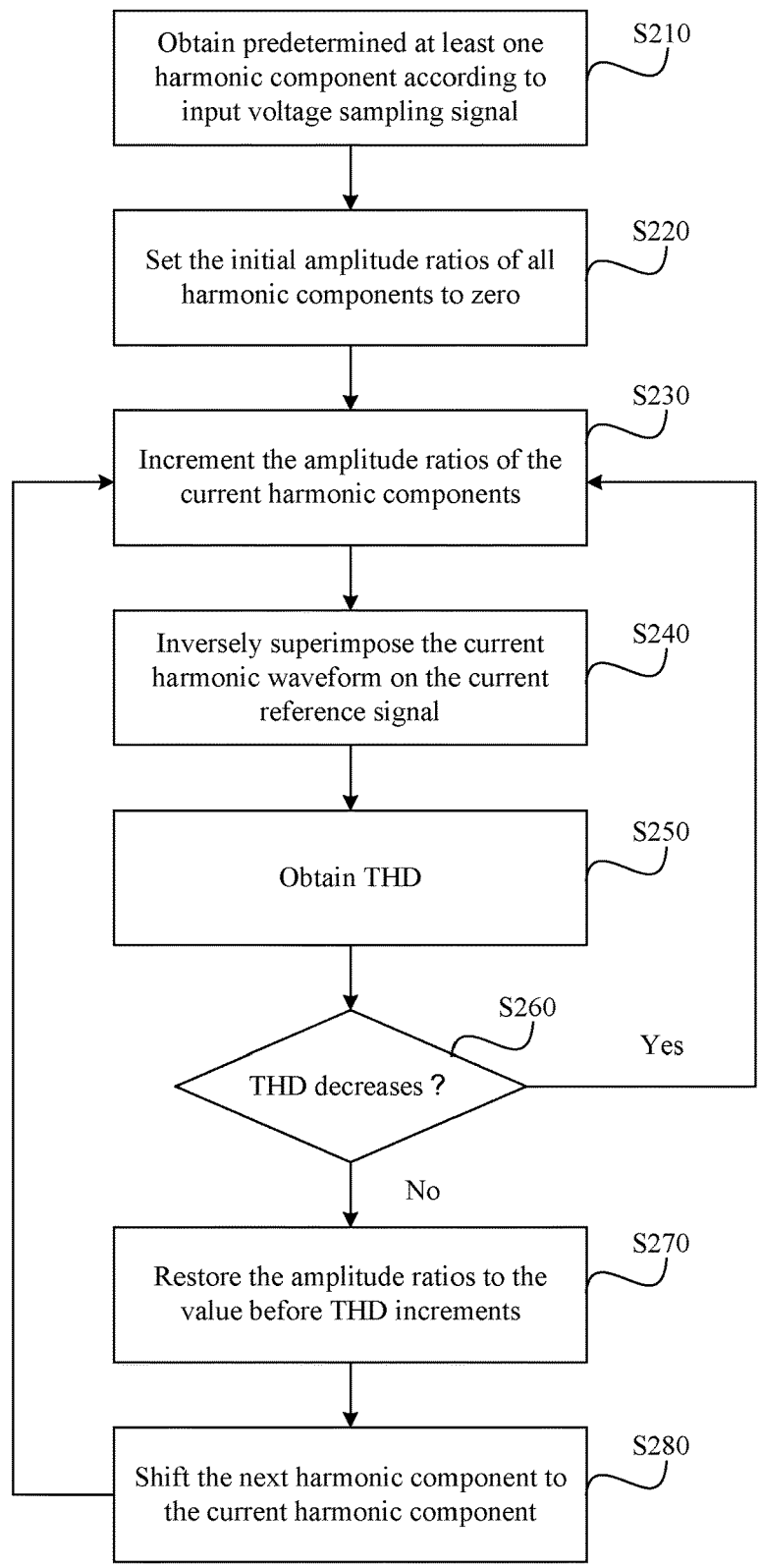
FIG. 4 is a flow diagram of another example control method, in accordance with embodiments of the present invention.

Referring now to FIG. 4, shown is a flow diagram of another example control method, in accordance with embodiments of the present invention. For example, minimizing the total harmonic distortion in S200 can include, at S210, obtaining a predetermined at least one harmonic component according to the input voltage sampling signal. Because there may be a lot of harmonic components in the input voltage, only one or more harmonic components with frequencies relatively close to the fundamental frequency may generally be compensated. The predetermined harmonic components can be sorted in advance, and then the amplitude ratios of the harmonic components may be sequentially adjusted (e.g., one by one).

At S220, the initial amplitude ratios of all harmonic components can be set to zero. At S230, the amplitude ratios of the present harmonic components may be incremented. For example, the incrementing operation can be performed according to a predetermined operation, or different increments can be calculated each time. At S240, the current harmonic component waveform can be inversely superimposed on the current reference signal. For example, the harmonic components can be calculated in advance, then multiplied by the amplitude ratios, and further inversely superposed on current reference signal Iref.

At S250, the current reference signal can be adjusted to obtain a new periodic total harmonic distortion. At S260, it can be determined whether the total harmonic distortion decreases after current reference signal Iref is adjusted. If yes, the flow can return back to S230, incrementing the amplitude ratios of the current harmonic components. If not, the amplitude ratios of the current harmonic components before incrementing may be closest to the actual ratios of the current harmonic components in the input signal, so the flow can go to S270. At S270, the amplitude ratios may be restored to the value prior to the total harmonic distortion increments. In addition, the current harmonic components can be superimposed with the amplitude ratios on the current reference signal.

At S280, the next harmonic component may be shifted to the current harmonic component, and the flow can return back to S230, to adjust the amplitude ratio of the next harmonic component. Therefore, for a predetermined one or more harmonic components, the amplitude ratios of the harmonic components in the input signal or the value closest to the amplitude ratio may be obtained in a scan-by-scan manner. The adjustment of the amplitude ratios can be maintained during system operation such that the total harmonic distortion of the system can be suppressed.

Figure 5:
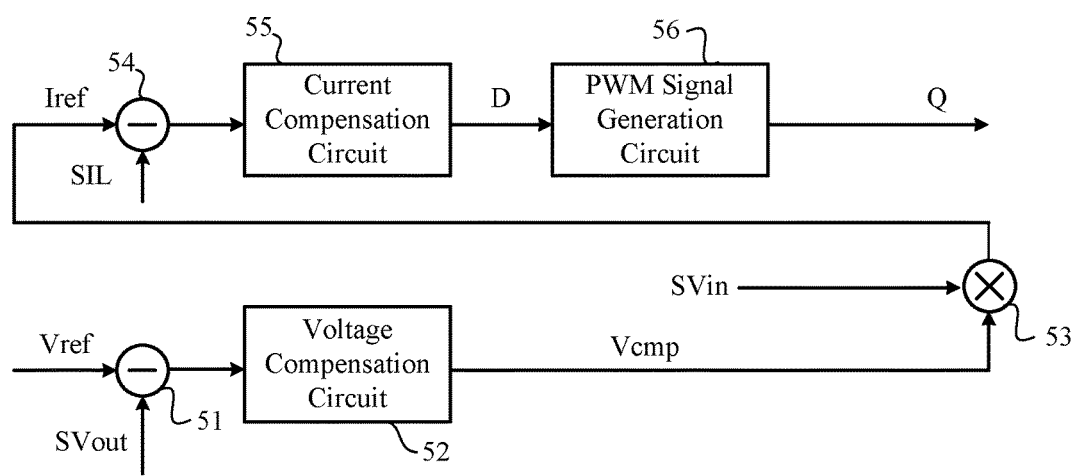
FIG. 5 is a diagram of an example data stream of an example controller.

Referring now to FIG. 5, shown is a diagram of an example data stream of an example controller. In this particular example, the controller can control inductor current IL in a closed loop. For example, output voltage Vout can be controlled in the voltage loop, and inductor current IL can be controlled in the current loop. The difference between output voltage sampling signal SVout and voltage reference signal Vref can be obtained by subtractor 51, and compensation signal Vcmp can be obtained by voltage compensation circuit 52. Further, compensation signal Vcmp can be multiplied by input voltage sampling signal SVin by multiplier 53.

The product signal output by multiplier 53 may be provided to subtractor 54 as current reference signal Iref. The difference between current reference signal Iref and inductor current sampling signal SIL may be obtained by subtractor 54 and compensated by current compensation circuit 54 to obtain signal D that represents the required duty cycle. PWM signal generator 56 can generate switching control signal Q according to signal D that represents the required duty cycle. However, this example controller may lack a pervasive mechanism for compensating the total harmonic distortion of the circuit.

Figure 6:
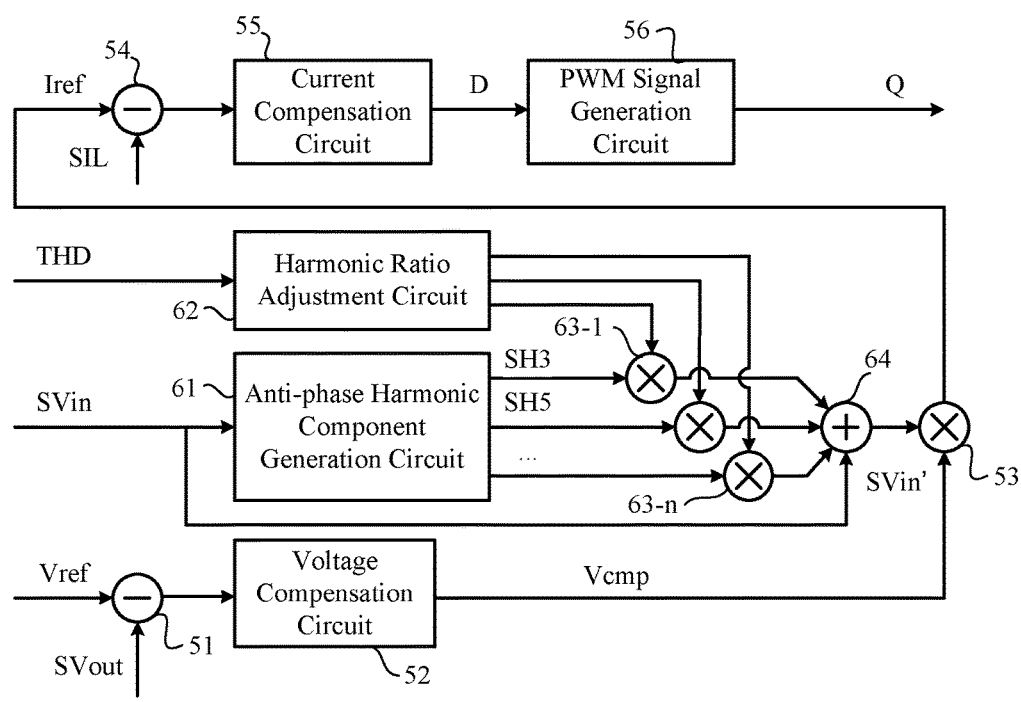
FIG. 6 is a diagram of an example data stream of an example controller, in accordance with embodiments of the present invention.

Referring now to FIG. 6, shown is a diagram of an example data stream of an example controller, in accordance with embodiments of the present invention. In this particular example, the controller can include subtractor 51, voltage compensation circuit 52, multiplier 53, subtractor 54, current compensation circuit 55, PWM signal generator 56, anti-phase harmonic generation circuit 61, harmonic ratio adjustment circuit 62, multipliers 63-1 to 63-$n$ that correspond to the number of predetermined harmonic components, and adder 64. For example, the difference between output voltage sampling signal SVout and voltage reference signal Vref can be obtained by subtractor 51, and compensation signal Vcmp may be obtained by voltage compensation circuit 52.

The anti-phase harmonic generation circuit can generate predetermined harmonic components (e.g., third harmonic component SH3, fifth harmonic component SH5, and so on) according to input voltage sampling signal SVin. Harmonic ratio adjustment circuit 62 may output the amplitude ratio that corresponds to the harmonic components according to the measured total harmonic distortion THD, and can adjust the amplitude ratio to minimize the total harmonic distortion. The amplitude ratio output by harmonic ratio adjustment circuit 62 may be multiplied by corresponding anti-phase harmonic component through multipliers 63-1 to 63-$n$. The multiplied product value can actually be the anti-phase harmonic components with amplitude. The anti-phase harmonic components with amplitude may be superimposed on the input voltage sampling signal through adder 64, in order to obtain output parameter SVin' that satisfies Equation (1) below.

$$SVin'=SVin+SH3*Ratio3+SH5*Ratio5+ \quad (1)$$

For example, SVin' is the parameter obtained after superimposing the anti-phase harmonic components, Ratioi is the amplitude ratio corresponding to the ith harmonic component, and the ratio can be generated and adjusted by harmonic ratio adjustment circuit 62. Multiplier 53 may receive signal SVin' and compensation signal Vcmp, and can output the product of both as current reference signal Iref. Thus, current reference signal Iref can satisfy Equation (2) shown below.

$$Iref = Vcmp*(SVin+SH3*Ratio3+SH5*Ratio5+...) = \quad (2)$$
$$Vcmp*SVin+Vcmp*SH3*Ratio3+Vcmp*SH5*Ratio5+...$$

In this way, a plurality of harmonic components extracted according to the input voltage can be inversely superimposed on current reference signal Iref. Harmonic ratio adjustment circuit 62 may adjust the amplitude ratio of each harmonic component according to the approach as shown in FIG. 4 until the measured total harmonic distortion no longer decreases. This can control the ratio of each harmonic components that are inversely superimposed on current reference signal Iref to be as close as possible to the actual harmonic components in the input signal. Further, the harmonic components may be removed by controlling the inductor current to approach current reference signal Iref, in order to minimize the total harmonic distortion THD.

In particular embodiments, the total harmonic distortion can be directly adjusted in a closed-loop manner by introducing the feedback parameter of the measured total harmonic distortion THD. Therefore, it may not be necessary to design a special compensation for a specific class of factors that affect the total harmonic distortion independently, which can simplify the overall control method.

Figure 7:
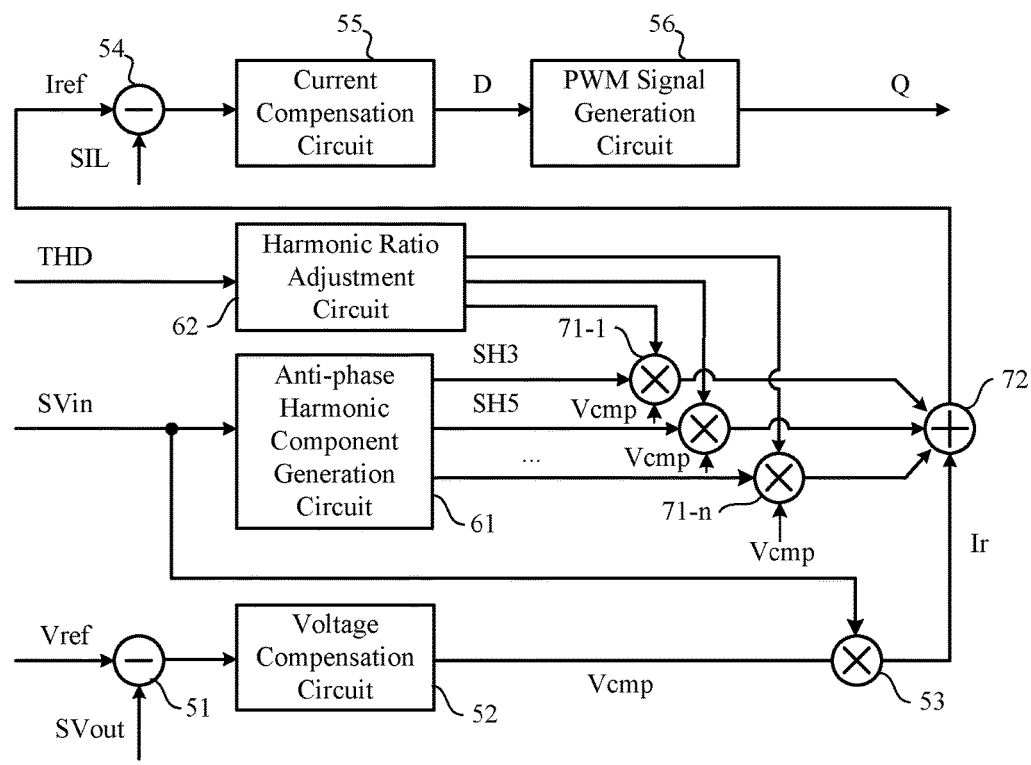
FIG. 7 is a diagram of another example data stream of an example controller, in accordance with embodiments of the present invention.

Referring now to FIG. 7, shown is a diagram of another example data stream of an example controller, in accordance with embodiments of the present invention. In this particular example, the difference between output voltage sampling signal SVout and voltage reference signal Vref can be obtained by subtractor 51, and compensation signal Vcmp may be obtained by voltage compensation circuit 52. Further, compensation signal Vcmp can be multiplied by input voltage sampling signal SVin through multiplier 53 in order to obtain product signal Ir. Further, the anti-phase harmonic generation circuit can generate predetermined harmonic components (e.g., third harmonic component SH3, harmonic component SH5, and so on) according to input voltage sampling signal SVin.

Harmonic ratio adjustment circuit 62 can output the amplitude ratios that correspond to the harmonic components according to the measured total harmonic distortion THD, and may adjust the amplitude ratios in order to minimize the total harmonic distortion. The amplitude ratios output by harmonic ratio adjustment circuit 62 can be multiplied by corresponding anti-phase harmonic components and compensation signal Vcmp through multipliers 71-1 to 71-$n$. The multiplied product value may actually be the product of the anti-phase harmonic components with amplitude and compensation signal Vcmp. The products can be superimposed on signal Ir by adder 72, in order to obtain current reference signal Iref, and current reference signal Iref can satisfy Equation (3) below.

$$Iref = Vcmp*SVin + Vcmp*SH3*Ratio3 + Vcmp*SH5*Ratio5+ \quad (3)$$

In certain embodiments, a plurality of harmonic components extracted according to the input voltage can be inversely superimposed on current reference signal Iref. Therefore, this approach can effectively control the total harmonic distortion of the circuit. It should be noted that the predetermined at least one harmonic component being inversely superimposed to adjust the current reference signal may not be limited to those discussed above. One skilled in the art will recognize that the above mentioned parameters and circuits can be modified in order to achieve the same or a similar function. For example, the anti-phase harmonic generation circuit can be replaced with an in-phase harmonic generation circuit, and adder 64 can be replaced with a subtractor, which may achieve the same function.

It is also to be understood that the methods, processes, units, and circuits described herein may be implemented in various circuits or devices, and may also be embodied as codes and/or data stored on a readable storage medium and executed on physical circuitry/devices, such as a processor. In addition, controllers described herein can be implemented in a variety of ways. For example, these techniques can be implemented in hardware, firmware, software, or a combination thereof. For example, the controller may be implemented in one or more of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units or combinations thereof for carrying out the functions described herein. For firmware or software implementations, rate control techniques may be implemented with circuitry or modules (e.g., procedures, functions, etc.) that perform the functions described herein. These software codes can be stored in memory and executed by the processor. The memory can be within or external to the processor. In the latter case, the memory can be communicatively coupled to the processor in any suitable fashion.

Figure 8:
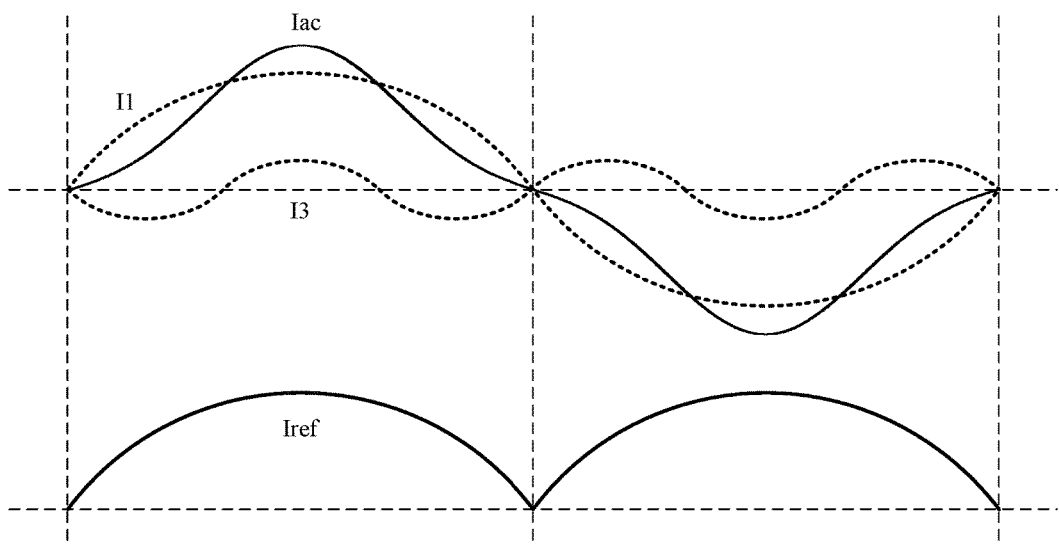
FIG. 8 is a waveform diagram of example operation of a power factor correction circuit, in accordance with embodiments of the present invention.
Figure 9:
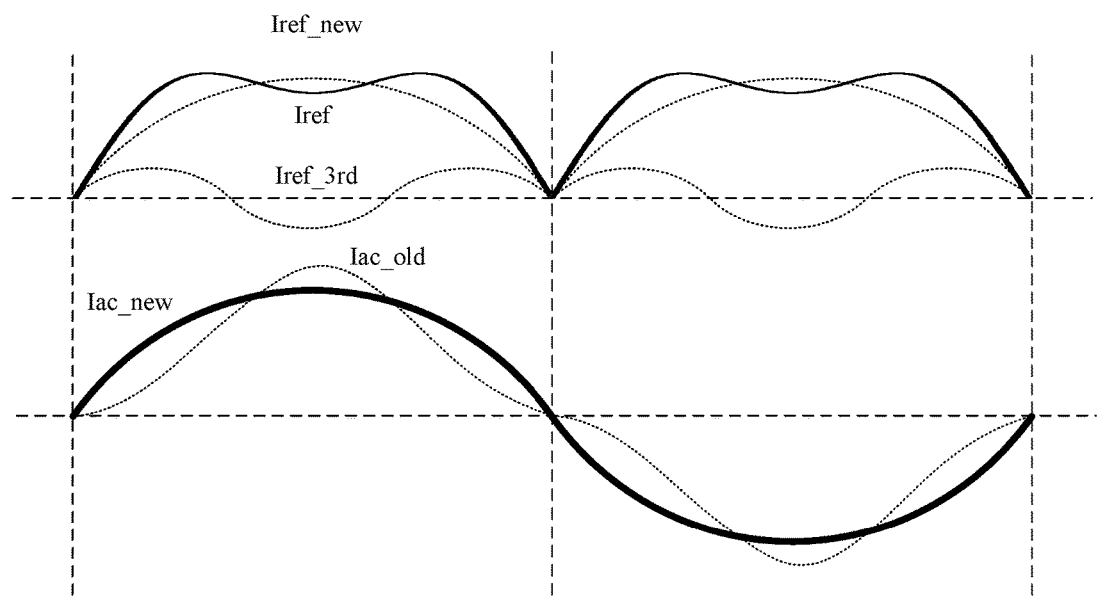
FIG. 9 is a waveform diagram of another example operation of a power factor correction circuit, in accordance with embodiments of the present invention.

Referring now to FIGS. 8 and 9, shown are waveform diagrams of example operation of a power factor correction circuit, in accordance with embodiments of the present invention. In FIG. 8, e.g., the total harmonic distortion of input AC current Iac is 25%, and the harmonic component is completely the third harmonic. In FIG. 8, Iac is the input current waveform of the power factor correction circuit, I1 is the fundamental current waveform, and I3 is harmonic component waveform, whereby Iac=I1+I3. When the system starts operation, a sinusoidal wave of the same phase and shape as input voltage Vin of switching-type regulator 22 may be utilized. Using this current reference signal, the total harmonic distortion measured by power meter 1 is 25%. Controller 3 can obtain the waveform of the corresponding third voltage harmonic (e.g., the sinusoidal signal of 3 times frequency) according to the waveform of input voltage sampling signal SVin.

Controller 3 can also begin inversely superimposing harmonic component Iref 3rd on the input voltage according to a predetermined set, and superimposed current reference signal Iref_new is shown in FIG. 9. Also, controller 3 may start gradually incrementing the amplitude ratio of the third harmonic component from zero. The amplitude ratio can be adjusted according to the feedback total harmonic distortion THD until the total harmonic distortion is minimized based on the amplitude ratio. After the third harmonic component compensation, the comparison between input current Iac_new and input current Iac_old before adjustment can be seen in FIG. 9. Thus, the third harmonic component of the input current can be removed to the maximum extent. If the predetermined harmonic components further include a fifth harmonic component, a seventh harmonic component, and so on, the adjustment procedure can be repeated in order to minimize the total harmonic distortion.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:
1. A power factor correction circuit, comprising:
 a) a power meter configured to measure total harmonic distortion (THD) at an input port;
 b) a switching-type regulator that is controllable by a switching control signal in order to adjust an inductor current of said switching-type regulator to perform power factor correction; and c) a controller configured to generate said switching control signal to control said switching-type regulator, wherein said controller reduces said THD by adjusting a current reference signal according to a measured THD, and said current reference signal represents an expected inductor current of said switching-type regulator.

2. The power factor correction circuit of claim 1, wherein said controller is configured to inversely superimpose at least one predetermined harmonic component on said current reference signal to adjust said current reference signal.

3. The power factor correction circuit of claim 2, wherein said controller is configured to reduce said THD by adjusting the amplitude ratio of each harmonic component according to said measured THD.

4. The power factor correction circuit of claim 3, wherein said controller is configured to increment said amplitude ratio of each harmonic component in a predetermined sequential order from zero until said measured THD no longer decreases, in order to minimize said THD.

5. The power factor correction circuit of claim 2, wherein said controller is configured to:
   a) inversely superimpose at least one voltage harmonic component on an input voltage sampling signal, wherein each voltage harmonic component corresponds to each harmonic component and has a corresponding amplitude ratio; and
   b) generate said current reference signal by multiplying at least one signal obtained by the inverse superimposing operation with a compensation signal, wherein said input voltage sampling signal represents an input voltage of said switching-type regulator, said voltage harmonic component is obtained according to said input voltage sampling signal, and said compensation signal represents a difference between a voltage reference signal and an output voltage of said switching-type regulator.

6. The power factor correction circuit of claim 2, wherein said controller is configured to:
   a) multiply at least one voltage harmonic component with a compensation signal respectively, wherein each voltage harmonic component corresponds to each harmonic component and has a corresponding amplitude with said compensation signal; and
   b) inversely superimpose at least one signal obtained by the multiplication operation respectively on a product of an input voltage sampling signal and said compensation signal to generate said current reference signal, wherein said input voltage sampling signal represents an input voltage of said switching-type regulator, said voltage harmonic component is obtained according to said input voltage sampling signal, and said compensation signal represents a difference between a voltage reference signal and an output voltage of said switching-type regulator.

7. The power factor correction circuit of claim 2, wherein said at least one predetermined harmonic component comprises at least one harmonic component that is adjacent to a fundamental wave.

8. A method of controlling a switching-type regulator with power factor correction, the method comprising:
   a) measuring, by a power meter, total harmonic distortion (THD) at an input port;
   b) controlling said switching-type regulator by a switching control signal for adjusting an inductor current of said switching-type regulator to perform power factor correction; and
   c) generating, by a controller, said switching control signal for controlling said switching-type regulator, wherein said controller reduces said THD by adjusting a current reference signal according to a measured THD, and said current reference signal represents an expected inductor current of said switching-type regulator.

9. The method of claim 8, wherein said adjusting said current reference signal comprises inversely superimposing at least one predetermined harmonic component on said current reference signal.

10. The method of claim 9, wherein adjusting said current reference signal comprises adjusting an amplitude ratio of each harmonic component according to said measured THD to reduce said THD.

11. The method of claim 10, wherein said adjusting said amplitude ratio of each harmonic component comprises incrementing said amplitude ratio of each said harmonic component in a predetermined sequential order from zero until said measured THD no longer decreases, in order to minimize said THD.

12. The method of claim 9, wherein said inversely superimposing comprises:
   a) inversely superimposing at least one voltage harmonic component on an input voltage sampling signal, wherein each voltage harmonic component corresponds to each harmonic component and has a corresponding amplitude ratio; and
   b) generating said current reference signal by multiplying at least one signal obtained by the inverse superimposing operation with a compensation signal, wherein said input voltage sampling signal is used to represent an input voltage of said switching-type regulator, said voltage harmonic component is obtained according to said input voltage sampling signal, and said compensation signal represents a difference between a voltage reference signal and an output voltage.

13. The method of claim 9, wherein said inversely superimposing comprises:
   a) multiplying at least one voltage harmonic component with a compensation signal respectively, wherein each voltage harmonic component corresponds to each harmonic component and has a corresponding amplitude; and
   b) inversely superimposing at least one signal obtained by the multiplication operation respectively on a product of an input voltage sampling signal and said compensation signal to generate said current reference signal, wherein said input voltage sampling signal is used to represent an input voltage of said switching-type regulator, said voltage harmonic component is obtained according to said input voltage sampling signal, and said compensation signal represents a difference between a voltage reference signal and said output voltage.

14. The method of claim 9, wherein said at least one predetermined harmonic component comprises at least one harmonic component that is adjacent to a fundamental wave.

15. A controller, comprising:
   a) a memory for storing a plurality of instructions; and
   b) a processor adapted to perform the method of claim 8 by executing said plurality of instructions.

* * * * *